US009427692B2

(12) United States Patent
Tashiro et al.

(10) Patent No.: US 9,427,692 B2
(45) Date of Patent: Aug. 30, 2016

(54) PAINT BOOTH WITH PURIFIER

(71) Applicant: BUNRI Incorporation, Miyazaki (JP)

(72) Inventors: Minoru Tashiro, Tokyo (JP); Makoto Tashiro, Tokyo (JP)

(73) Assignee: BUNRI Incorporation (JP)

( * ) Notice: Subject to any disclaimer, the term of this patent is extended or adjusted under 35 U.S.C. 154(b) by 78 days.

(21) Appl. No.: 14/317,230

(22) Filed: Jun. 27, 2014

(65) Prior Publication Data

US 2014/0360375 A1 Dec. 11, 2014

Related U.S. Application Data

(63) Continuation of application No. PCT/JP2014/056277, filed on Mar. 11, 2014.

(30) Foreign Application Priority Data

Jun. 7, 2013 (JP) .................................. 2013-121197

(51) Int. Cl.
*B05B 15/12* (2006.01)
*B01D 47/02* (2006.01)

(52) U.S. Cl.
CPC .......... *B01D 47/022* (2013.01); *B05B 15/1266* (2013.01); *B05B 15/1277* (2013.01); *B01D 2247/04* (2013.01); *B01D 2247/105* (2013.01); *B01D 2247/14* (2013.01); *Y02P 70/36* (2015.11)

(58) Field of Classification Search
CPC .... B01D 50/004; B01D 53/18; B01D 45/06; B01D 47/022; B05B 15/1222
USPC ............. 55/DIG. 46, 385.1; 454/52; 261/30; 118/326, 600, 602, 603, 610, 612
See application file for complete search history.

(56) References Cited

U.S. PATENT DOCUMENTS 4,537,120 A * 8/1985 Josefsson ............ B05B 15/1222
454/52
4,608,064 A * 8/1986 Napadow ............. B01D 50/004
261/30

(Continued)

FOREIGN PATENT DOCUMENTS

BE 642177 A 5/1964
CN 1426851 A 7/2003

(Continued)

OTHER PUBLICATIONS

Notification of Transmittal of Translation of International Preliminary Report dated Dec. 17, 2015 with Written Opinion of the International Searching Authority regarding International Application No. PCT/JP2014/056277 (7 pages).

(Continued)

*Primary Examiner* — Duane Smith
*Assistant Examiner* — Minh-Chau Pham
(74) *Attorney, Agent, or Firm* — Harness, Dickey & Pierce, P.L.C.

(57) ABSTRACT

A paint booth is provided with a booth body and a purifier. The purifier is provided with a water tank, water rope formation mechanism, sludge removal mechanism, exhaust mechanism, barrier member, inclined plate, and windshield plate. Water falling from nozzles of a water case forms water ropes. The inclined plate has a water receiving surface sloping forwardly down from the barrier member toward a water surface of the water tank. A lower end of the windshield plate is in contact with water in the water tank. An airflow reversal section is formed between a lower end of the inclined plate and the water surface. Air directed downward from an airflow inlet is turned upward at the airflow reversal section and directed to an exhaust chamber through air circulation sections.

11 Claims, 6 Drawing Sheets

(56) References Cited

U.S. PATENT DOCUMENTS

| | | | | |
|---|---|---|---|---|
| 5,019,138 | A | * | 5/1991 | Farrah .................... B01D 53/18 |
| | | | | 55/DIG. 46 |
| 5,135,550 | A | * | 8/1992 | Telchuk ................ B01D 45/06 |
| | | | | 118/326 |
| 5,153,034 | A | * | 10/1992 | Telchuk ............. B05B 15/1222 |
| | | | | 118/326 |
| 5,256,308 | A | | 10/1993 | Dulany |
| 5,741,178 | A | | 4/1998 | Telchuk |
| 8,435,348 | B2 | * | 5/2013 | Tashiro ................ B01D 47/022 |
| | | | | 118/600 |
| 2012/0048189 | A1 | | 3/2012 | Tashiro |

FOREIGN PATENT DOCUMENTS

| | | |
|---|---|---|
| DE | 19959942 C1 | 6/2001 |
| EP | 2409779 A1 | 1/2012 |
| GB | 1004239 A | 9/1965 |
| JP | 51-134661 U | 10/1976 |
| JP | 51-134661 | 11/1976 |
| JP | 02-172553 | 7/1990 |
| JP | 2002-273292 A | 9/2002 |
| JP | 3704084 B2 | 10/2005 |
| JP | 2012-120935 A | 6/2012 |
| JP | 5339642 B2 | 11/2013 |
| KR | 2012-0008052 A | 1/2012 |
| WO | WO-2010-131564 A1 | 11/2010 |

OTHER PUBLICATIONS

Extended Search Report from European Patent Office (EPO) for Application No. 14730726.8 dated Jan. 4, 2016 (6 pages).

Office Action with Search Report mailed Jan. 5, 2016 regarding Application No. 201480000645.3 filed in China (with English translation) (14 pages).

Search Report and Written Opinion for Application No. 11201405344S from Singapore dated Feb. 17, 2015 (19 pages).

Japanese Office Action for Application No. 2014-513603 dated Jun. 24, 2014 with English translation (7 pages).

International Search Report for Application No. PCT/JP2014/056277 dated Aug. 11, 2014 with English translation of the Written Opinion (8 pages).

Substantive Examination Report mailed on Apr. 8, 2016 from the Intellectual Property Office of The Philippines in corresponding application No. BE642177A (3 pages).

Office Action regarding Notification for Filing Opinion mailed on Apr. 11, 2016 in corresponding Application No. 10-2014-7026124 filed in Korea (with English translation) (12 pages).

* cited by examiner

PAINT BOOTH WITH PURIFIER

CROSS REFERENCE TO RELATED APPLICATIONS

This application is a Continuation Application of PCT Application No. PCT/JP2014/056277, filed Mar. 11, 2014 and based upon and claiming the benefit of priority from prior Japanese Patent Application No. 2013-121197, filed Jun. 7, 2013, the entire contents of all of which are incorporated herein by reference.

BACKGROUND OF THE INVENTION

1. Field of the Invention

This invention relates to a paint booth with a purifier for removing paint mist permeating the air in a coating chamber.

2. Description of the Related Art

In performing a coating operation by means of a paint sprayer such as a device comprising spray nozzles in a coating chamber, a paint booth with a purifier is used in order to prevent the working environment in the coating chamber from being degraded or to prevent paint mist from being discharged to the outside. In a paint booth of the Venturi booth type disclosed in, for example, Jpn. Pat. Appln. KOKAI Publication No. 2002-273292 (Patent Document 1), air containing paint mist is drawn into an eddy chamber by an exhaust fan, and the paint mist is separated from the airflow by means of centrifugal force in the eddy chamber. Further, moist air delivered from the eddy chamber is discharged through an exhaust port after being dehydrated by an eliminator. In a paint booth of the water booth type disclosed in Japanese Patent No. 3704084 (Patent Document 2), on the other hand, a water curtain is formed by pouring water drawn up by a pump in the form of a film along a water flow plate. The paint mist is washed away when it contacts this water curtain.

In either of the paint booths disclosed in Patent Documents 1 and 2, collected paint mist is deposited together with water in a water tank and condenses, thereby forming paint sludge (paint residue) in the water tank. This paint sludge accumulates in the water tank, floating on the water surface or settling in the water tank. Since conventional paint booths do not comprise a mechanism for purifying water in the water tank, an operator or operators must periodically manually remove the paint sludge. However, the periodic cleaning cannot purify contaminated water unless the water is changed. Accordingly, the paint sludge gradually accumulates in the water tank and solidifies at the bottom of the water tank or near the water surface, and therefore, cannot be easily removed and causes contamination. In the water booth type (Patent Document 2), the paint mist contacts only one surface of the water curtain, so that the surface area that allows collection of the paint mist is limited. Thus, the capacity to collect the paint mist is small.

In order to solve these problems, the inventors hereof have developed such a paint booth with a purifier as that shown in International Publication No. WO2010/131564A1 (Patent Document 3). Although the paint booth of Patent Document 3 is more compact than the paint booths of Patent Documents 1 and 2, it can efficiently collect the paint mist.

In order to improve the working environment in a coating chamber, airflow from a booth opening toward an exhaust chamber must be produced at a certain speed or higher. To this end, Article 16 of the current Ordinance on the Prevention of Organic Solvent Poisoning in Japan states that the minimum air speed at the booth opening should be 0.4 m/s or more. If air in the coating chamber is discharged by means of an exhaust fan, however, the water surface of a water tank of a purifier is undulated by air flowing near the water surface, so that paint sludge in water cannot easily gather near the water surface. Thus, it is difficult to efficiently remove the paint sludge in the water tank by means of a conveyor of the purifier.

BRIEF SUMMARY OF THE INVENTION

Accordingly, the object of the present invention is to provide a paint booth capable of efficiently collecting paint mist, preventing the water surface of a water tank from being undulated by air flowing from a booth opening toward an exhaust chamber, and efficiently removing paint sludge in the water tank.

Means for Solving the Problem

A paint booth according to the present invention comprises a booth body comprising a coating chamber and a booth opening, a water tank disposed in a lower part of the booth body, a water rope formation mechanism comprising a water case disposed in an upper part of the booth body and configured to form a plurality of parallel water ropes from water falling from nozzles formed in a bottom wall of the water case, a pump configured to draw up water from the water tank and feed the water into the water case, a barrier member comprising a vertically extending wall portion disposed behind the water ropes, an exhaust chamber formed behind the barrier member and divided from the coating chamber by the barrier member, an exhaust mechanism configured to discharge air from the exhaust chamber, an inclined plate disposed below the nozzles and comprising a water receiving surface sloping forwardly down at an angle from a vertically intermediate portion of the barrier member toward a water surface of the water tank, a windshield plate comprising an upper end and a lower end and defining an air circulation section in conjunction with a rear surface of the inclined plate, the lower end contacting water in the water tank, and a sludge removal mechanism comprising a conveyor configured to discharge paint sludge in the water tank to the outside of the water tank.

According to the present invention, paint mist in air can be efficiently collected by water ropes. Since air flowing from a booth opening toward an exhaust chamber can be prevented from passing near the water surface of a water tank, moreover, the water surface can be prevented from undulating. Thus, paint sludge in water can easily gather near the water surface, so that the paint sludge floating near the water surface can be efficiently carried away by a conveyor of a sludge removal mechanism.

A porous ventilation section with a large number of holes may be disposed at a lower part of the inclined plate. An example of the porous ventilation section is made of a punching metal disposed at the lower part of the inclined plate. An intake guide member, which extends upwardly from a sidewall of the water tank, may be provided in front of the porous ventilation section, and an airflow inlet communicating with the coating chamber may be disposed between the intake guide member and the porous ventilation section. Further, an airflow guide plate, which closes a gap between an eave portion of the booth body and the water case, may be disposed between the eave portion and the bottom wall of the water case. An example of the conveyor comprises an upper-side portion movable along the water surface of the water tank and a lower-side portion movable along a bottom portion of the water tank, and chains at the upper-side portion and chains at the lower-side portion are individually disposed below the water surface in the water tank.

A porous ventilation section with a plurality of vertically extending slits may be disposed at a lower part of the inclined plate. A reinforcing plate extending along the slits may be provided on a rear surface of the inclined plate. Further, a handle may be disposed on an upper part of the inclined plate. In an alternative embodiment, moreover, a first porous ventilation section with a plurality of vertically extending first slits is disposed at a lower part of the inclined plate, and a second porous ventilation section with a plurality of vertically extending second slits is disposed at an upper part of the inclined plate, the length of the second slits being shorter than the length of the first slits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 5.

Figure 1:
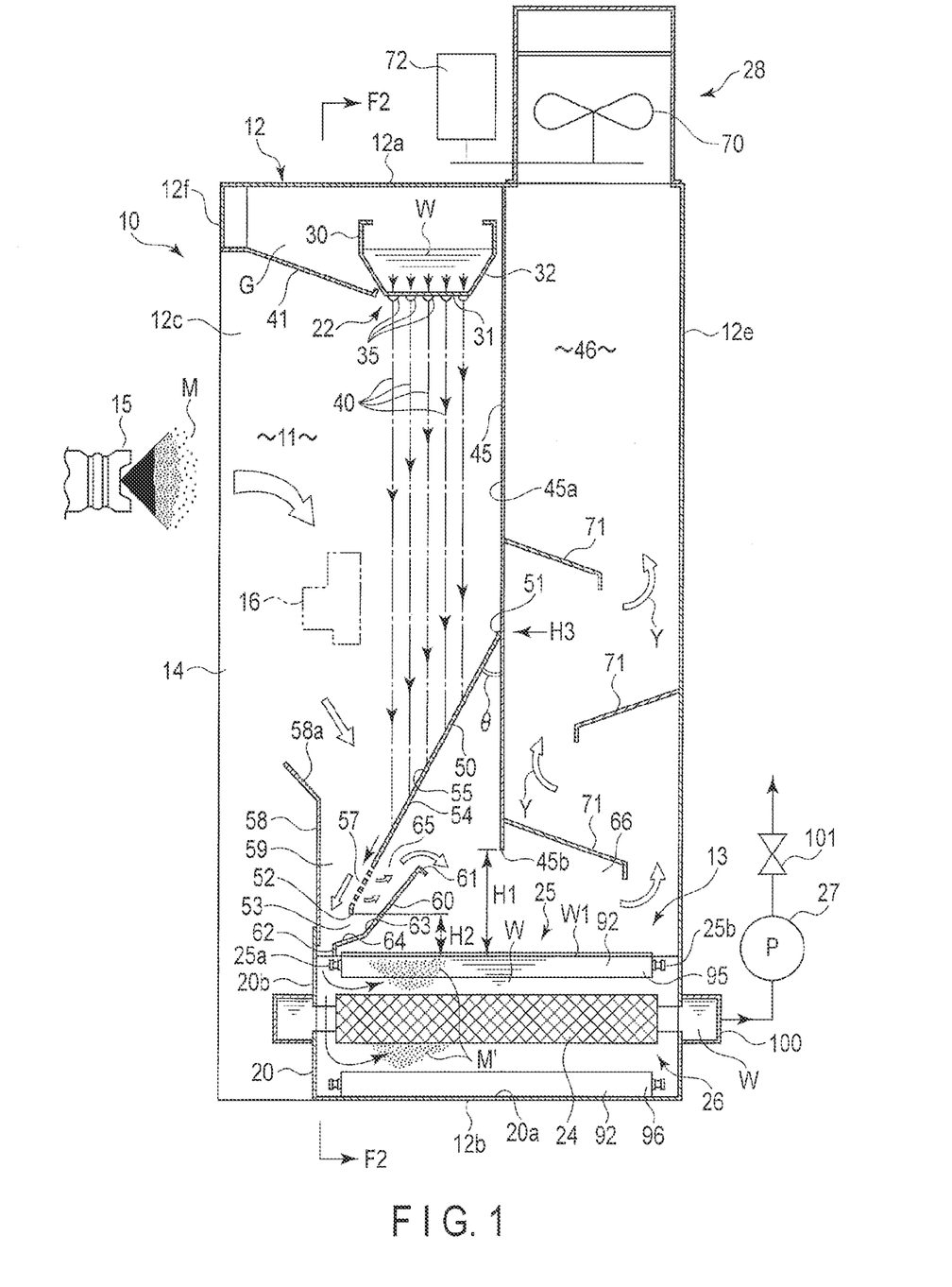
FIG. 1 is a sectional view of a paint booth with a purifier according to one embodiment of the present invention.
Figure 2:
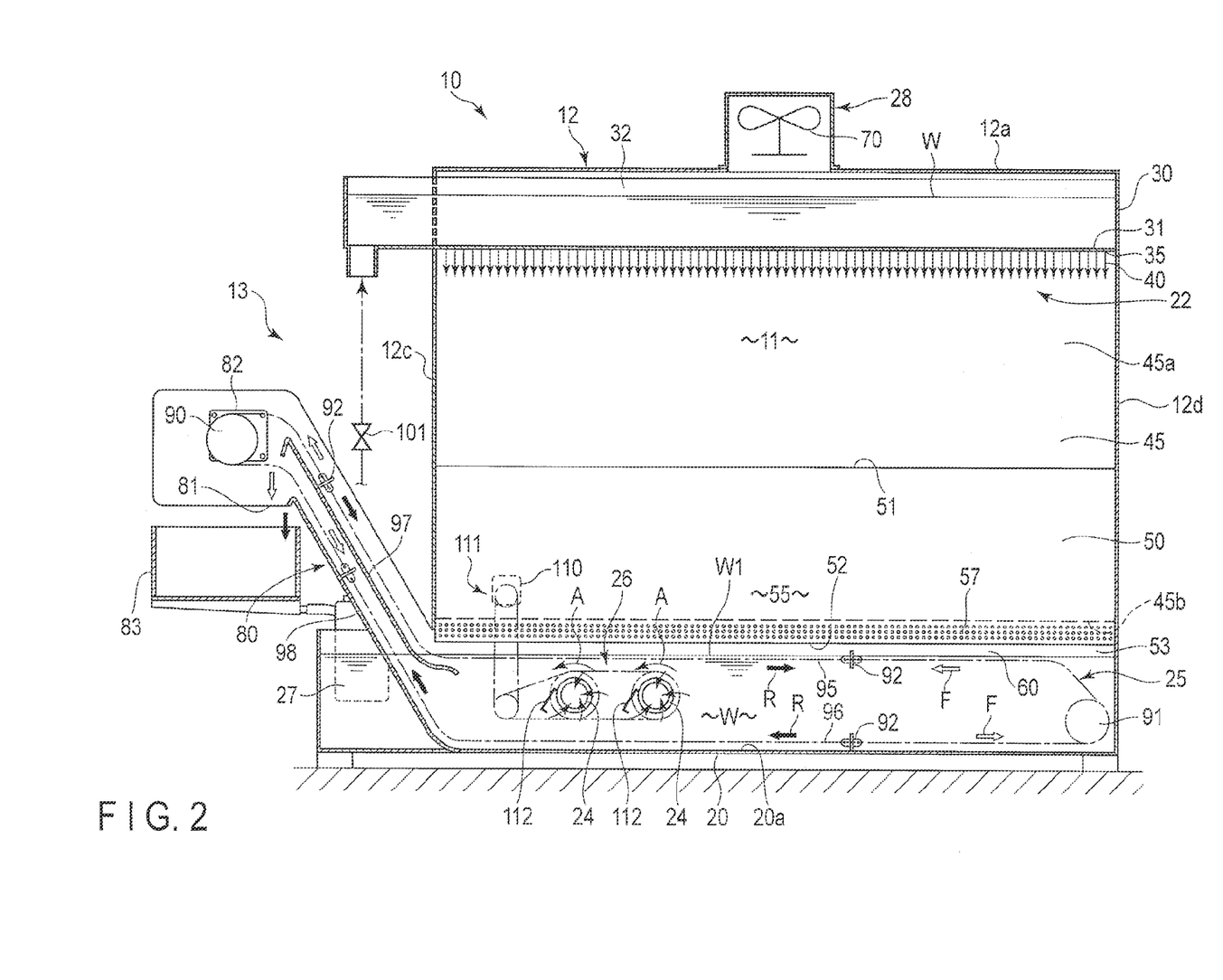
FIG. 2 is a sectional view of the paint booth taken along arrow F2-F2 in FIG. 1.

FIG. 1 is a longitudinal sectional view of a paint booth 10. FIG. 2 is a sectional view of the paint booth 10 taken in the direction of arrow F2-F2 in FIG. 1. The paint booth 10 comprises a booth body 12, which comprises a coating chamber 11, and a purifier 13 configured to remove paint mist M (FIG. 1). The booth body 12 comprises a top wall 12a, bottom wall 12b, sidewalls 12c and 12d, rear wall 12e, etc. A booth opening 14 facing the coating chamber 11 is formed in the front surface of the booth body 12, that is, on the side where a painter stands.

The coating chamber 11 accommodates therein a paint sprayer with a spray nozzle 15 and an object 16 to be coated. The paint mist M is produced by an atomized paint sprayed from the spray nozzle 15. The purifier 13 has the function of removing the paint mist M permeating the air in the coating chamber 11. The following is a description of the purifier 13.

The purifier 13 comprises a water tank 20, water rope formation mechanism 22, sludge removal mechanism 26, pump 27, exhaust mechanism 28, etc. The water tank 20 is disposed in the lower part of the coating chamber 11. The water rope formation mechanism 22 is provided in the upper part of the coating chamber 11. The sludge removal mechanism 26 comprises a drum filter 24 and conveyor 25. The pump 27 is used to draw up clean water W filtered by the drum filter 24.

The water rope formation mechanism 22 comprises a water case 30. The water case 30 is disposed in the upper part of the coating chamber 11, that is, above the water tank 20. The water case 30 is made of plate metal of stainless steel or the like, and horizontally extends substantially throughout the transverse length of the coating chamber 11, as shown in FIG. 2.

Figure 3:
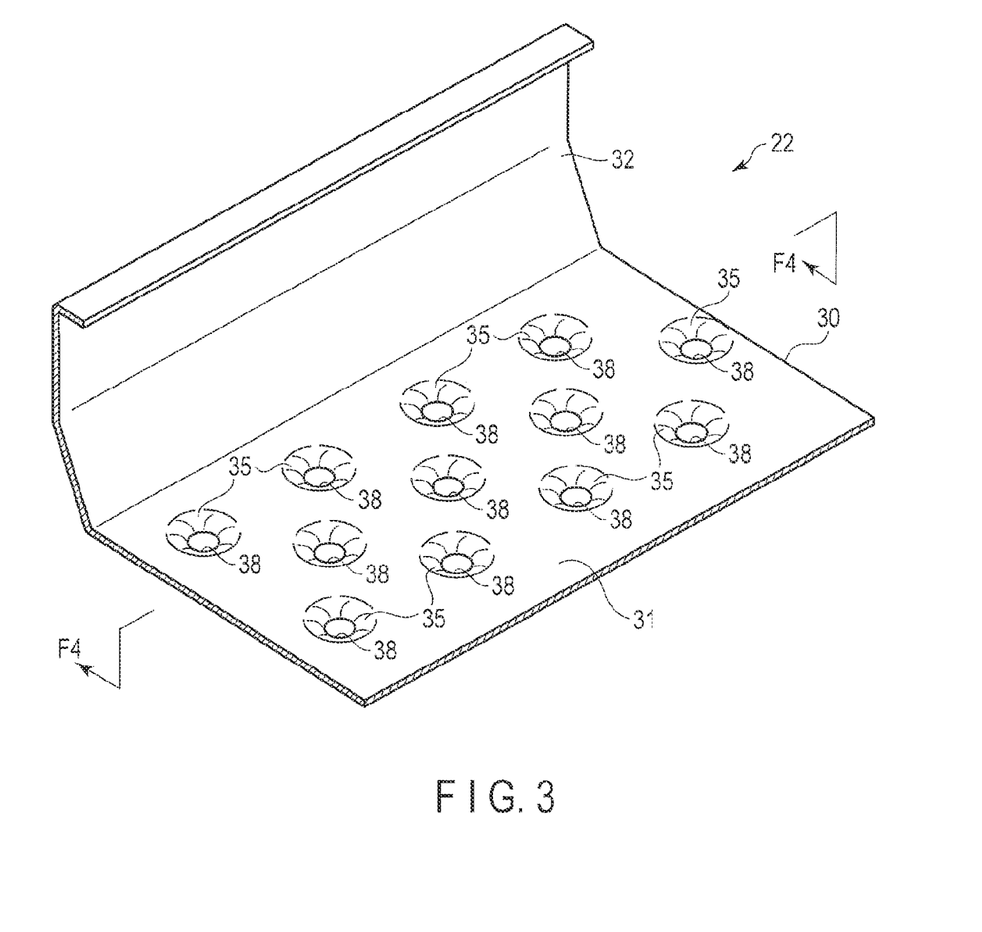
FIG. 3 is a perspective view of a part of a water rope formation mechanism of the paint booth shown in FIG. 1.

FIG. 3 shows a part of the water case 30. The water case 30 comprises a horizontally extending bottom wall 31 and a side wall 32, which extends upwardly from a side edge of the bottom wall 31. A large number of nozzles 35 are formed at regular intervals in the bottom wall 31 of the water case 30. The nozzles 35 are arranged at regular intervals as viewed from above the water case 30.

Figure 4:
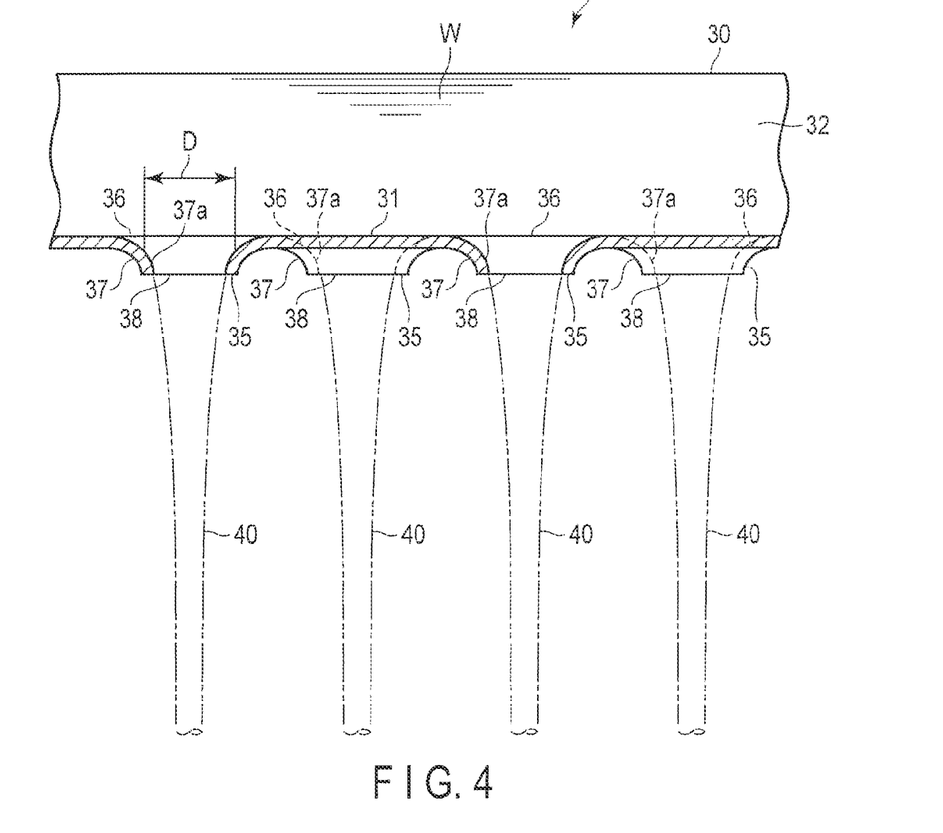
FIG. 4 is a sectional view of nozzles taken along line F4-F4 in FIG. 3.

FIG. 4 shows a longitudinal cross-section of the nozzles 35. Each of the nozzles 35 comprises an inlet 36, tubular portion 37 protruding downwardly from the bottom wall 31, and outlet 38. The inlet 36 opens in the upper surface of the bottom wall 31 of the water case 30. The tubular portion 37 has its inside diameter D reduced downward from the inlet 36. The outlet 38 opens at the lower end of the tubular portion 37. The inlet 36 and outlet 38 are circular as viewed from above.

In the cross-section of FIG. 4, an inner peripheral surface 37a of the tubular portion 37 is shown as a continuous surface smoothly curved in a circular arc from the inlet 36 toward the outlet 38. A portion ranging from the inlet 36 to the inner peripheral surface 37a of the tubular portion 37 is formed in a smooth round shape such that flowing water does not cause turbulence.

When the water W is introduced into the water case 30, as shown in FIG. 4, this water W flows into the tubular portions 37 through the inlets 36 and further freely falls down through the outlets 38. The water flowing directly downward from the respective outlets 38 of the nozzles 35 falls straight without causing turbulence. Thus, the water continuously flows in lines, thereby forming ropelike water columns, at least when it is on the way to reach the water tank 20 through the outlets 38. This is why the term "water rope" (registered trademark No. 5299640/5299641) is used in this specification. The water rope can also be called a water cord because of its shape.

Since the falling speed increases as the water goes down, these water ropes 40 are gradually tapered downward. However, the tubular portion 37 of each nozzle 35 has a curved surface that does not easily cause turbulence, so that the water can flow in substantially continuous linear streams until just before it reaches the water tank 20. Thus, the water ropes 40 descending from the nozzles 35 are kept parallel to one another, and the distances between the descending water ropes 40 are equal to one another. Consequently, a group of water columns, comprising a large number of water ropes 40, is formed between the water case 30 and water tank 20 without allowing the water ropes 40 to join one another.

As shown in FIG. 1, an airflow guide plate 41, which serves to close gap G between the water case 30 and an eave portion 12*f* of the booth body 12, is provided in the upper part of the booth opening 14. A vertically extending barrier member 45 of sheet metal is disposed in the rear part of the coating chamber 11 (or behind the water ropes 40). A wall portion 45*a* of the barrier member 45 is a substantially vertical surface.

The interior of the paint booth 10 is divided between the coating chamber 11 and an exhaust chamber 46 by the barrier member 45. The exhaust chamber 46 is formed behind the barrier member 45. The barrier member 45 is formed of a metal plate of stainless steel or the like and comprises the substantially vertical wall portion 45*a* extending along the water ropes 40. The wall portion 45*a* extends vertically. A lower end 45*b* of the barrier member 45 is spaced at distance H1 above water surface W1 in the water tank 20. As shown in FIG. 2, the barrier member 45 is disposed substantially covering the entire transverse length of the coating chamber 11.

Above the water surface W1 of the water tank 20, an inclined plate 50 of sheet metal is oppositely disposed just below the nozzles 35. This inclined plate 50 is disposed substantially covering the entire transverse length of the coating chamber 11. As shown in FIG. 1, the inclined plate 50 has an upper end 51 and lower end 52. The upper end 51 of the inclined plate 50 is located at vertically intermediate part H3 of the wall portion 45*a* of the barrier member 45.

The lower end 52 of the inclined plate 50 is spaced at distance H2 above the water surface W1 in the water tank 20. This distance H2 is shorter than the distance H1 from the water surface W1 to the lower end 45*b* of the barrier member 45. An airflow reversal portion 53 for upwardly directing air introduced through the booth opening 14 is formed between the lower end 52 of the inclined plate 50 and the water surface W1. The airflow reversal portion 53 is formed substantially covering the entire transverse length of the coating chamber 11.

The upper surface of the inclined plate 50 serves as a water receiving surface 55, which is inclined to receive the water ropes 40. The water receiving surface 55 slopes forwardly down at an angle θ from the vertically intermediate part H3 of the barrier member 45 toward the water surface W1. This angle θ is set to be an acute angle of 20 to 45°, depending on the drop of the water ropes 40 (or the length of the water ropes 40), the number of water ropes 40, the size of the coating chamber 11, etc. While the angle θ is set to, for example, about 30°, it may also be another angle.

Figure 5:
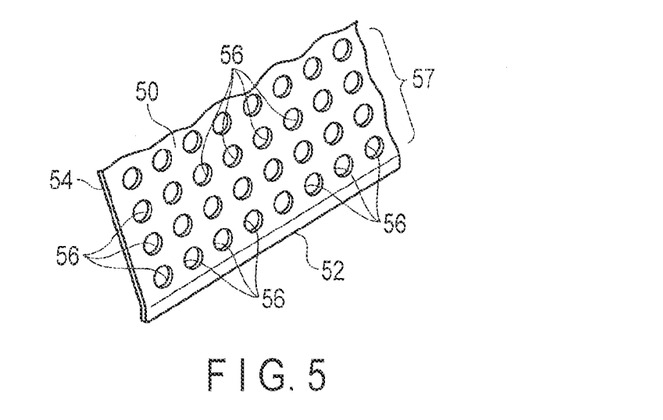
FIG. 5 is a perspective view of the lower part of an inclined plate of the paint booth shown in FIG. 1.

FIG. 5 shows the lower part of the inclined plate 50. A porous ventilation section 57 with a large number of holes 56 is formed at the lower part of the inclined plate 50. For example, the porous ventilation section 57 is made of a punched metal plate (for example, stainless-steel plate) formed with the large number of holes 56 by a punching machine. The number of holes 56 and the hole diameter are set according to the displacement of the exhaust mechanism 28, the flow-passage cross-sectional area of the airflow reversal section 53, etc. While an example of the hole diameter of the holes 56 is 5 mm, another hole diameter (2 to 8 mm) may be used instead.

As shown in FIG. 1, an intake guide member 58 is disposed in front of the inclined plate 50. The intake guide member 58 extends upwardly from the upper end of a sidewall 20*b* of the water tank 20. An upper part 58*a* of the intake guide member 58 is shaped so that it extends to a position higher than the porous ventilation section 57 and is then bent toward the booth opening 14. An airflow inlet 59 communicating with the coating chamber 11 is defined between the intake guide member 58 and inclined plate 50. The lower end of the airflow inlet 59 communicates with the airflow reversal section 53.

A windshield plate 60 is located in a position facing a rear surface 54 of the lower part of the inclined plate 50. The windshield plate 60, like the inclined plate 50, is formed of a metal plate of stainless steel or the like and is provided substantially covering the entire transverse length of the coating chamber 11. The windshield plate 60 comprises an upper end 61, lower end 62, air guide surface 63 formed between the upper and lower ends 61 and 62, and water receiving surface 64 formed below the air guide surface 63.

The upper end 61 of the windshield plate 60 is disposed in a position higher than the porous ventilation section 57. The lower end 62 of the windshield plate 60 is inserted into the water in the water tank 20. For example, the lower end 62 is located several millimeters to several tens of millimeters below the water surface W1. The lower end 62 of the windshield plate 60 may be slightly spaced apart from the water surface W1 when the water surface W1 is stationary. When the water surface W1 is undulating, however, at least a part of the lower end 62 must be disposed in contact with the water W in the water tank 20.

The windshield plate 60 is shaped so that it rises obliquely upward, along the rear surface 54 of the inclined plate 50, from the lower end 62 toward the barrier member 45. An air circulation section 65 communicating with the airflow reversal section 53 is formed between the air guide surface 63 and inclined plate 50. This air circulation section 65 continuously horizontally extends substantially throughout the transverse length of the coating chamber 11. The air circulation section 65 communicates with the exhaust chamber 46 by means of an air circulation section 66 at the lower part of the exhaust chamber 46.

The exhaust mechanism 28 comprises the exhaust chamber 46, an exhaust fan 70 disposed at the upper part of the exhaust chamber 46, eliminators 71 at a plurality of positions in the exhaust chamber 46, etc. The exhaust fan 70 is driven by a motor 72 to discharge air passing through the booth opening 14 to the outside via the airflow reversal section 53, exhaust chamber 46, etc. Thus, the exhaust mechanism 28 has the function of producing a flow of air from the coating chamber 11 to the exhaust chamber 46 such that the air containing the paint mist and passing through the booth opening 14 can contact the water ropes 40.

The following is a description of the sludge removal mechanism 26. The sludge removal mechanism 26 comprises the drum filter 24 and conveyor 25. The drum filter 24 is located in a position lower than the water surface W1 of the water tank 20. As shown in FIG. 2, a lift portion 80 extending obliquely upward is formed on a side part of the water tank 20. A sludge discharge portion 81 and motor 82 for driving the conveyor 25 are arranged at the upper part of the lift portion 80. The sludge discharge portion 81 and motor 82 are located higher than the water surface W1 of the water tank 20. A sludge collection box 83 is placed below the sludge discharge portion 81.

The conveyor 25 comprises chains 25*a* and 25*b* (FIG. 1), which endlessly travel between an upper sprocket 90 and lower sprocket 91, and a plurality of scrapers 92 attached at predetermined intervals to the chains 25*a* and 25*b*. This conveyor 25 comprises an upper-side portion (forward-path portion) 95 and lower-side portion (return-path portion) 96. The chains 25*a* and 25*b* at the upper-side portion 95 and lower-side portion 96 are individually disposed below the water surface W1 and submerged under the water W in the water tank 20. The upper-side portion 95 moves in the water along the water surface W1 of the water tank 20. The lower-side portion 96 moves in the water along a bottom portion 20a of the water tank 20.

By rotating the motor 82 forward and reverse, the conveyor 25 can be moved in a first direction indicated by arrow F in FIG. 2 and second direction indicated by arrow R. The motor 82 is configured so that its direction of rotation is changed for each predetermined time by a control unit (not shown) comprising a timer that functions as switching means. The timing (interval) for the timer for changing the direction is set so that the time for the movement in the first direction F is longer than that for the movement in the second direction R. If necessary, the motor 82 can change the moving direction by means of a manually operable switch.

As shown in FIG. 2, a first guide plate 97 and second guide plate 98 are arranged in the lift portion 80. The first guide plate 97 extends obliquely upward from the water tank 20 toward the sludge discharge portion 81. The second guide plate 98 extends obliquely upward from the bottom portion 20a of the water tank 20 toward the sludge discharge portion 81.

The scrapers 92 of the conveyor 25 are individually in contact with the respective upper surfaces of the guide plates 97 and 98. If the conveyor 25 moves in the first direction F, paint sludge floating near the water surface W1 is moved along the first guide plate 97 toward the sludge discharge portion 81 by the scrapers 92 of the upper-side portion 95 of the conveyor 25. If the conveyor 25 moves in the second direction R, paint sludge that has settled on the bottom portion 20a of the water tank 20 is moved along the second guide plate 98 toward the sludge discharge portion 81 by the scrapers 92 of the lower-side portion 96 of the conveyor 25.

The drum filter 24 is disposed below the water surface W1 of the water tank 20 and between the upper-side portion 95 and lower-side portion 96 of the conveyor 25. The drum filter 24 may be one or two or more in number. The drum filter 24 comprises a porous plate as a cylindrical filter element and rotates about a horizontal axis. The filtered water W filtered through the drum filter 24 is delivered to the pump 27 through a clean water passage 100 (FIG. 1). The clean water W drawn up by the pump 27 flows into the water case 30 via a valve 101.

The drum filter 24 is rotated in the direction of arrow A by a filter rotation mechanism 111 using a motor 110 (FIG. 2) as a drive source. A scraping member 112 (only a part of which is shown in FIG. 2) for preventing clogging of the drum filter 24 is in contact with the inner and outer peripheral surfaces of the drum filter 24. The paint sludge scraped off by the scraping member 112 is deposited toward the lower-side portion 96 of the conveyor 25.

The following is a description of functions of the paint booth 10 with the purifier 13 constructed in this manner.

The water W drawn up by the pump 27 is introduced into the water case 30. A large number of water ropes 40 are formed as the water in the water case 30 flows out downwardly through the respective outlets 38 of the nozzles 35.

The water of the water ropes 40 deposited on the water receiving surface 55 of the inclined plate 50 falls from the lower end 52 of the inclined plate 50 onto the water receiving surface 64 of the windshield plate 60. Further, some of the water deposited on the inclined plate 50 falls onto the windshield plate 60 through the holes 56 of the porous ventilation section 57. The intake guide member 58 is disposed in front of the water receiving surface 55. Thus, the water of the water ropes 40 does not splash into the coating chamber 11, so that an operator can avoid being made wet by the water even if the operator is near the water ropes 40.

When air in the exhaust chamber 46 is discharged as the exhaust fan 70 rotates, the air in the coating chamber 11 flows through the airflow inlet 59 into the exhaust chamber 46 via the airflow reversal section 53 and air circulation sections 65 and 66. The air rising in the exhaust chamber 46 moves in a zigzag, impinging on the eliminators 71, for example, as indicated by arrow Y in FIG. 1. In the middle of this rise, water in the air, for example, adheres to the eliminators 71 and drops.

If the air moves from the booth opening 14 toward the water ropes 40, the paint mist M in the air is collected by the water ropes 40. After the collected paint mist M is deposited together with water on the inclined plate 50, it flows into the water tank 20. Paint sludge M' (FIG. 1) introduced into the water tank 20 temporarily sinks under water and then, for the most part, floats on the water surface W1.

As the conveyor 25 moves in the first direction F, the paint sludge floating near the water surface W1 is conveyed to the sludge discharge portion 81 by the scrapers 92 and deposited in the sludge collection box 83. As the conveyor 25 moves in the second direction R, the paint sludge that has settled on the bottom portion 20a of the water tank 20 is conveyed from the bottom portion 20a of the water tank 20 to the sludge discharge portion 81 and deposited in the sludge collection box 83.

The water in the water tank 20 is filtered by the drum filter 24, and the filtered water W is drawn up from the clean water passage 100 by the pump 27 and introduced again into the water case 30. As the drum filter 24 rotates, the paint sludge attracted to the peripheral surface of the drum filter 24 is scraped off by the scraping member 112 and deposited toward the lower-side portion 96 of the conveyor 25.

According to the paint booth 10 with the purifier 13 of the present embodiment, as described above, the water falling from the large number of nozzles 35 on the water case 30 forms the group of the water ropes 40. Thus, the surface area of the water can be made larger than in the case of a conventional simple water curtain, so that the paint mist can be efficiently collected.

Since the water (water ropes 40) falling from the nozzles 35 is received by the inclined plate 50, moreover, the water surface W1 in the water tank 20 can be prevented from violently undulating. Thus, the paint sludge in the water easily gathers near the water surface W1, and the paint sludge floating on the water surface W1 can be efficiently carried away by the conveyor 25. Then, clean water purified by the drum filter 24 can be recycled by the pump 27.

The paint booth 10 comprises the airflow guide plate 41 configured to close the gap G between the water case 30 and the eave portion 12f of the booth body 12. By means of this airflow guide plate 41, the air in the coating chamber 11 can be prevented from escaping to the outside through an atmosphere release portion of the water case 30. By the use of the airflow guide plate 41, moreover, the paint mist M in the coating chamber 11 can be prevented from being mixed into the clean water W in the water case 30.

Since the intake guide member 58 is disposed in front of the inclined plate 50, moreover, airflow passing through the booth opening 14 can be efficiently guided into the airflow inlet 59. Thus, the air passing through the booth opening 14 can be guided toward the airflow reversal section 53 by the airflow inlet 59 that is defined between the intake guide member 58 and inclined plate 50.

Since the porous ventilation section 57 made of a punching metal is provided at the lower part of the inclined plate 50, furthermore, some of the air that passes through the airflow inlet 59 can be caused to flow into the air circulation section 65 through the holes 56 of the porous ventilation section 57. Thus, the intake resistance near the airflow inlet 59 can be made lower than in the case where the porous ventilation section 57 is not provided. If the intake resistance near the airflow inlet 59 is high, air is drawn into the booth through an opening (for example, the lift portion 80) other than the booth opening 14, so that the speed of the air passing through the booth opening 14 is inevitably reduced. According to the present embodiment, in contrast, the intake resistance near the airflow inlet 59 can be reduced by means of the porous ventilation section 57. Thus, the air can be prevented from being drawn into the booth through the lift portion 80 or the like, so that the minimum air speed at the booth opening 14 can be set to a desired value (for example, 0.4 m/s or more).

The air drawn into the airflow inlet 59 through the booth opening 14 turns upward at the airflow reversal section 53 and moves toward the air circulation section 65. In other words, the air having flowed into the water tank 20 through the airflow inlet 59 is directed along the windshield plate 60 to above the water surface W1. Thus, a strong airflow can be prevented from occurring near the water surface W1.

Based on these synergistic effects, the airflow moving from the booth opening 14 to the exhaust chamber 46 can be stabilized and the water surface W1 can be prevented from undulating violently. Thus the paint sludge in the water easily gathers near the water surface W1, and bubbles containing the paint sludge are formed on the water surface W1. The paint sludge near the water surface W1 is conveyed to the sludge discharge portion 81 via the lift portion 80 by the upper-side portion 95 of the conveyor 25.

Figure 6:
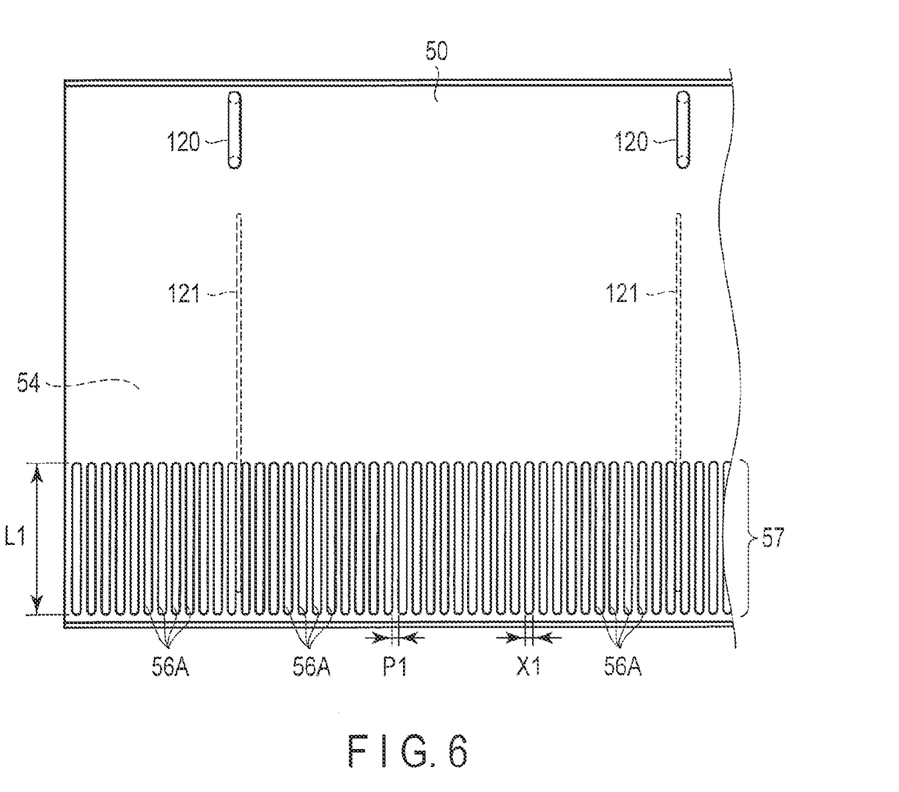
FIG. 6 is a front view of a part of an inclined plate according to a second embodiment.

FIG. 6 shows a part of an inclined plate 50 according to a second embodiment. A porous ventilation section 57 with a plurality of slits 56A is formed at the lower part of the inclined plate 50. For example, the inclined plate 50 is a metal plate (for example, stainless-steel plate) having the porous ventilation section 57 formed of a large number of slits 56A. The slits 56A individually extend vertically. The size and number of these slits 56A are set according to the displacement of an exhaust 0mechanism 28 (FIG. 1), the flow-passage cross-sectional area of an airflow reversal section 53 (FIG. 1), etc. An example of each slit 56A has length L1 of 180 mm, a width X1 of 10 mm, and a pitch P1 of 7 mm.

Handles 120 are provided on the upper part of the inclined plate 50. In assembling the inclined plate 50 to the body of a booth, the operator can easily handle the inclined plate 50 by holding the handles 120. Reinforcing plates 121 are provided on a rear surface 54 of the inclined plate 50. The reinforcing plates 121 vertically extend along the slits 56A. Since the rigidity of the inclined plate 50 can be increased by means of the reinforcing plates 121, deformation of the inclined plate 50 can be avoided even though water ropes 40 continuously impinge on the inclined plate 50. Since the booth with this inclined plate 50 shares other configurations and functions with the paint booth 10 of the first embodiment, common numbers are used to designate portions common to the first embodiment, and a description of those portions is omitted.

Figure 7:
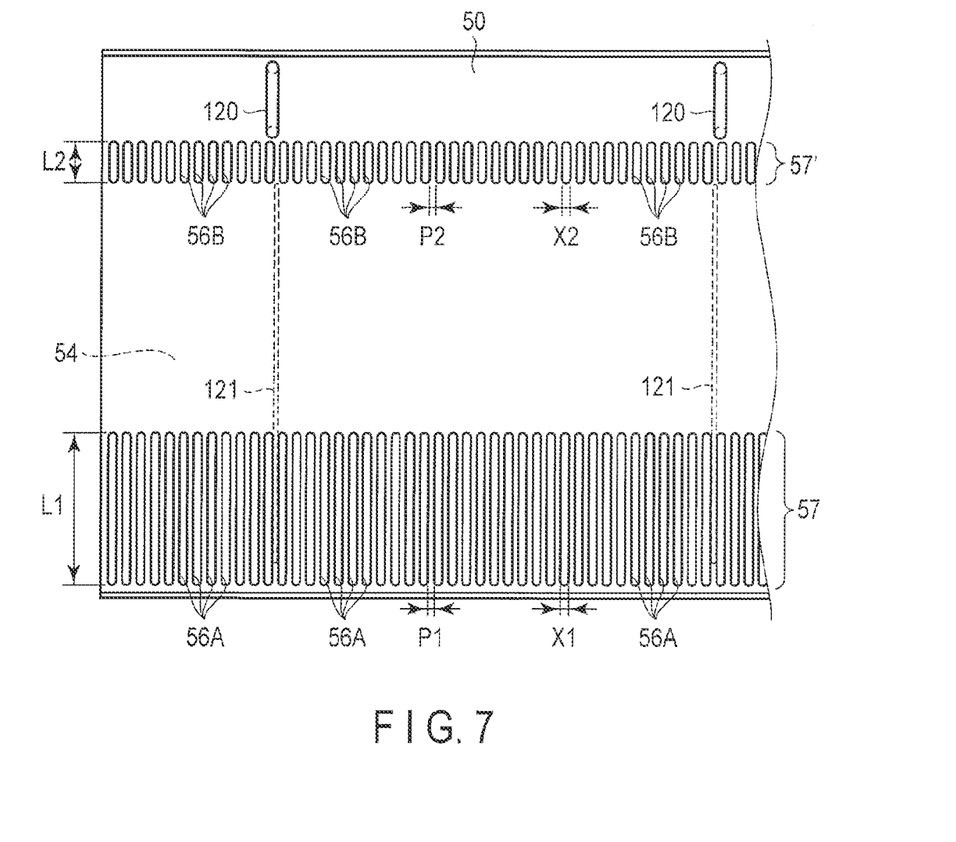
FIG. 7 is a front view of a part of an inclined plate according to a third embodiment.

FIG. 7 shows a part of an inclined plate 50 according to a third embodiment. A first porous ventilation section 57 with a plurality of first slits 56A is formed at the lower part of the inclined plate 50. A second porous ventilation section 57' with a plurality of second slits 56B is formed at the upper part of the inclined plate 50. The slits 56A and 56B individually extend vertically. Length L2 of the second slits 56B is shorter than length L1 of the first slits 56A. The slits 56A individually extend vertically. An example of each second slit 56B has length L2 of 50 mm, width X1 of 10 mm, and pitch P1 of 7 mm. Since a booth with the inclined plate 50 of this embodiment shares other configurations and functions with the paint booth with the inclined plate 50 of the second embodiment, common numbers are used to designate portions common to the second embodiment, and a description of those portions is omitted.

It is to be understood, in carrying out this invention, that the structures, shapes, layouts, etc., of the constituent elements of the paint booth, including the barrier member, inclined plate, windshield plate, exhaust mechanism, sludge removal mechanism, etc., as well as the coating chamber, booth body, water tank, and water rope formation mechanism, may be embodied in various modified forms. For example, a porous material other than a punching metal may also be used for the porous ventilation section provided at the lower part of the inclined plate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A paint booth with a purifier, comprising:
   a booth body comprising a coating chamber and a booth opening;
   a water tank disposed in a lower part of the booth body;
   a water rope formation mechanism comprising a water case disposed in an upper part of the booth body and configured to form a plurality of parallel water ropes from water falling from nozzles formed in a bottom wall of the water case;
   a pump configured to draw up water from the water tank and feed the water into the water case;
   a barrier member comprising a vertically extending wall portion disposed behind the water ropes;
   an exhaust chamber formed behind the barrier member and divided from the coating chamber by the barrier member;
   an exhaust mechanism configured to discharge air from the exhaust chamber;
   an inclined plate disposed below the nozzles and comprising a water receiving surface sloping forwardly down at an angle from a vertically intermediate portion of the barrier member toward a water surface of the water tank, the inclined plate including a porous ventilation section with a large number of holes disposed at a lower part of the inclined plate above the water surface;
   a windshield plate comprising an upper end and a lower end and defining an air circulation section in conjunction with a rear surface of the inclined plate, the lower end contacting water in the water tank;
   a sludge removal mechanism comprising a conveyor configured to discharge paint sludge in the water tank to the outside of the water tank;
   an intake guide member disposed in front of the porous ventilation section and opposed to the porous ventilation section; and an airflow inlet disposed between the intake guide member and the porous ventilation section.

2. The paint booth with a purifier according to claim 1, wherein the holes of the porous ventilation section are formed at a lower part of the water receiving surface.

3. The paint booth with a purifier according to claim 2, wherein the porous ventilation section is made of a punching metal disposed at the lower part of the inclined plate.

4. The paint booth with a purifier according to claim 2, wherein the intake guide member extends upwardly from a sidewall of the water tank and the airflow inlet communicates with the coating chamber.

5. The paint booth with a purifier according to claim 3, wherein the intake guide member extends upwardly from a sidewall of the water tank and the airflow inlet communicates with the coating chamber.

6. The paint booth with a purifier according to claim 1, further comprising an airflow guide plate disposed between the bottom wall of the water case and an eave portion of the booth body formed above the booth opening and configured to close a gap between the eave portion and the water case.

7. The paint booth with a purifier according to claim 1, wherein the conveyor comprises an upper-side portion movable along the water surface of the water tank and a lower-side portion movable along a bottom portion of the water tank, chains at the upper-side portion and chains at the lower-side portion being individually disposed below the water surface in the water tank.

8. The paint booth with a purifier according to claim 1, further comprising a porous ventilation section with a plurality of vertically extending slits disposed at a lower part of the inclined plate.

9. The paint booth with a purifier according to claim 8, further comprising a reinforcing plate extending along the slits on a rear surface of the inclined plate.

10. The paint booth with a purifier according to claim 9, further comprising a handle disposed on an upper part of the inclined plate.

11. The paint booth with a purifier according to claim 8, further comprising a first porous ventilation section with a plurality of vertically extending first slits disposed at a lower part of the inclined plate and a second porous ventilation section with a plurality of vertically extending second slits disposed at an upper part of the inclined plate, the length of the second slits being shorter than the length of the first slits.

* * * * *